United States Patent
Collings

(10) Patent No.: US 7,015,819 B2
(45) Date of Patent: Mar. 21, 2006

(54) EVENT NOTIFICATION SYSTEM AND WET WELL MONITOR

(75) Inventor: John K. Collings, Mablston, GA (US)

(73) Assignee: Mission Communications, LLC, Norcross, GA (US)

( * ) Notice: Subject to any disclaimer, the term of this patent is extended or adjusted under 35 U.S.C. 154(b) by 104 days.

(21) Appl. No.: 10/397,117

(22) Filed: Mar. 26, 2003

(65) Prior Publication Data

US 2003/0184444 A1 Oct. 2, 2003

Related U.S. Application Data

(60) Provisional application No. 60/368,445, filed on Mar. 27, 2002.

(51) Int. Cl.
*G08B 21/00* (2006.01)

(52) U.S. Cl. .................... 340/618; 340/506; 73/307

(58) Field of Classification Search ........... 340/618, 340/623, 506, 531, 500; 417/7, 40, 1; 73/290 R, 73/307
See application file for complete search history.

(56) References Cited

U.S. PATENT DOCUMENTS

| | | | | |
|---|---|---|---|---|
| 4,341,504 A | * | 7/1982 | Hignutt et al. | 417/8 |
| 4,456,432 A | * | 6/1984 | Mannino | 417/2 |
| 4,529,359 A | * | 7/1985 | Sloan | 417/34 |
| 4,551,068 A | * | 11/1985 | Boudreaux | 417/8 |
| 4,705,456 A | * | 11/1987 | Gardeen | 417/7 |
| 5,672,050 A | * | 9/1997 | Webber et al. | 417/18 |
| 6,139,281 A | * | 10/2000 | Schooler | 417/40 |
| 6,561,135 B1 | * | 5/2003 | Creech et al. | 119/245 |
| 6,649,839 B1 | * | 11/2003 | Eckert et al. | 174/74 R |

* cited by examiner

*Primary Examiner*—Phung T. Nguyen
(74) *Attorney, Agent, or Firm*—Bockhop & Associates, LLC; Bryan W. Bockhop

(57) ABSTRACT

An alarm detection device for monitoring high level signal in a wet well. The alarm detection device includes a fail safe circuit and an emulation circuit. The incoming high level signal is fed into the fail safe circuit and the emulation circuit. The emulated signal from the emulation circuit is fed to an output to a control panel and an alarm system. If there is any problem with the alarm detection device, the fail safe circuit connects the incoming high level signal directly with the output to the control panel and a high impedance signal is generated for the alarm system. The alarm detection device is powered independently from the control panel.

8 Claims, 3 Drawing Sheets

EVENT NOTIFICATION SYSTEM AND WET WELL MONITOR

CROSS REFERENCE TO OTHER APPLICATION

This application claims priority of a provisional application, Alarm Detection Device for Sewer Pump Stations, application Ser. No. 60/368,445, filed on Mar. 27, 2002, which is incorporated by reference in its entirety herein.

BACKGROUND OF THE INVENTION

1. Field of the Invention

The invention relates to high liquid level detection system and, more specifically, to high level alarm system in a wet well.

2. Description of Related Art

Throughout the world sanitary sewer collection systems utilize gravity flow to direct wastewater to water reclamation plants. Many times the waste water cannot move via gravity the entire distance to a water reclamation plant, and it must be pumped up to higher elevations to continue its gravity flow to the water reclamation plant. During these pumping steps, wastewater is temporarily contained in low point tanks called wet wells. These wet wells have pumps that occasionally pump the wastewater toward the reclamation plant. The pumps and their associated controls are located at the wet wells and are powered by utility provided alternate current (AC) power. When there is a failure of AC power (for a variety of reasons) the wet well pumps and their associated controls cannot operate. Some pump stations have standby generators to operate the pumps in such outages, but many do not. Therefore, during AC outages no pumping can occur. However, during such AC outages, waste water flow continues into the wet well and, therefore, during AC outages there is a much higher likelihood of high wet well situations, which if unresolved, will result in a waste water spill into the general environment.

Generally, the wet wells are equipped with high-level alarm floats that detect high level situations. During these situations as the wastewater continues to rise in the wet well the high-level alarm floats are reached and tipped by the wastewater. When a float tips, a mercury type switch inside the float completes a circuit, which, if there were AC power, would energize a relay, which in turn would energize a local alarm circuit. This high wet well relay would also indicate an alarm to a separate (optional) alarm monitoring system that would transmit (via a plurality of means) the alarms to an entity(s) off site.

Some times a separate high level float is installed at the pump station and is connected directly to the alarm system. This is problem for two reasons. First, it is typically difficult to "pull" another high level float as the conduit from the wet well to the control panel is sealed to prevent gases from entering the control panel, thereby requiring excessive installation time. Second, the second high level float adds cost and can interfere with the original high level float. Since there is no local AC power this local and off site alarming does not occur in case of AC power failure. Additionally, retrofitting an alarm or monitoring system to an existing pump station control panel can be difficult and demand additional auxiliary/interposing relays, which the existing control panel may not be able to accommodate from a physical size stand point.

Accordingly, it would be advantageous to provide a system that provides a better way for monitoring high level in a wet well.

SUMMARY OF THE INVENTION

The present invention is an apparatus for detecting high level liquid in a wet well. The apparatus receives an incoming state signal from a high level float and transmits an emulated signal to a control panel and to an alarm system. The incoming state signal reflects state of the high level float. The apparatus may not have its own power supply and is typically powered by the alarm system. The apparatus has a fail safe circuit and an emulation circuit. The fail safe circuit selectively decouples a connection between the incoming state signal and an emulated signal to the control panel. Upon power failure the connection between the incoming state signal and the emulated signal to the control panel are coupled, thus establishing a direct connection between the incoming state signal and the emulated signal to the control panel.

The emulation circuit receives the incoming state signal from the fail safe circuit when the connection between the incoming state signal is decoupled from the emulated signal to the control panel. The emulation circuit generates the emulated signal according to the incoming state signal. Upon power failure or mechanical failure, the emulation circuit drives the emulated signal to the alarm system to a high impedance state, thus indicating failure of the apparatus.

DETAIL DESCRIPTION OF THE INVENTION

In this description, like numerals refer to like elements throughout the several views. The invention is an alarm detection device that allows continuous monitoring of industry standard high liquid level detection floats found in many sanitary sewer pumping stations (wet wells). Additionally, the alarm detection device provides for unique secondary monitoring functions and installation methods. The alarm detection device could be used in other applications that employ similar floats to detect high liquid level such as tank level or other liquid containment devices.

Figure 1:
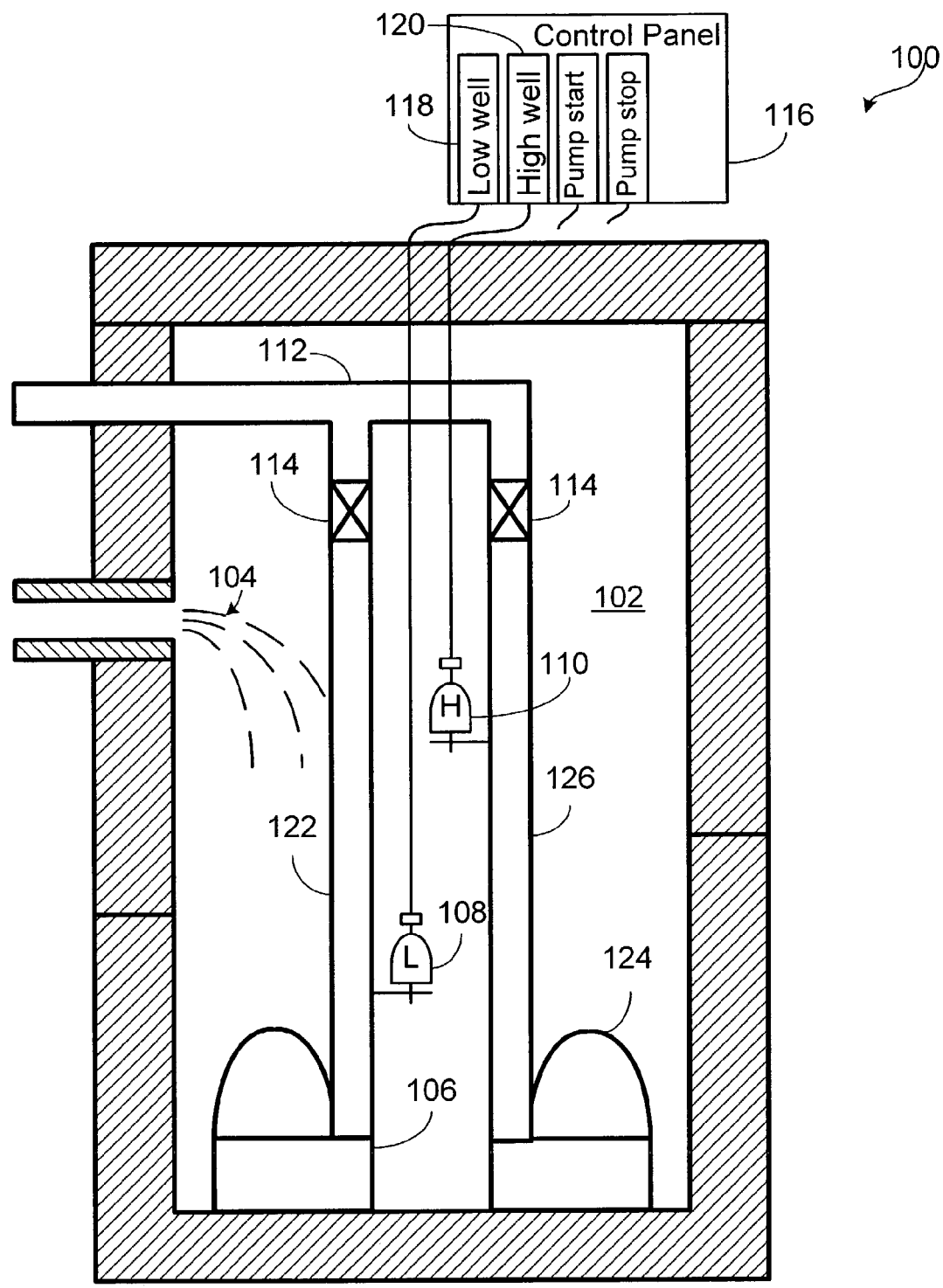
FIG. 1 is a prior art schematic diagram of a wet well monitoring system.

FIG. 1 illustrates a wet well monitoring system 100. The wet well 102 generally has at least one low level pump 106 with a low level float 108 attached to it. The pump 106 is connected via a pipe 122 and a one directional valve (check valve) 114 to a conduit 112 that takes sewage to a water reclamation station or to a high elevation for continuing gravity flow toward the water reclamation station. The wet well 102 has one or more inlets 104 through which the liquid flows in. The wet well 102 may also have another high level pump 124 with a high level float 110. The high level pump 124 is also connected to the conduit 112 via a pipe 126 and another one directional valve 114. Both the low level float 108 and the high level float 110 are connected to a control panel 116, which controls the operation of the low level pump 106 and the high level pump 124 (control not shown). The high level float 110 is connected via a pair of high level float wires to a high level connector 120 and the low level connector 108 is connected via a pair of low level float wires to a low level connector 118.

Under normal conditions, the low level pump 106 operates to pump the liquid out of the wet well 102 when the liquid reaches the low level float 108 activation level. In the event of failure of the low level pump 106 or sudden increasing in the incoming liquid volume, the high level pump 124 operates when the high level float 110 activation level is reached. The high level pump 124 serves as a back up pump for the wet well 102. When the high level float 110 activation level is reached, the control panel 116 may send an alarm to an alarm system (not shown in FIG. 1) to indicate a potential problem a the wet well 102. However, if there is an AC power failure at the control panel 116, the pumps will not function and the control panel 116 will not be able to send any alarm indication to the alarm system.

The alarm detection device according to the invention primarily solves problems of detecting, enunciating and transmitting occurrences of high liquid level in a monitored liquid containment vessel after the monitored site has lost its primary AC power. Additionally, the alarm detection device also provides a retrofit installation method, which takes advantage of existing standard pump station configurations that allow the device to perform its unique monitoring task while not effecting the pump station's existing operations and greatly reducing installation time. Furthermore, the alarm detection device can incorporate other detection circuitry to perform additional, needed monitoring functions.

Figure 2:
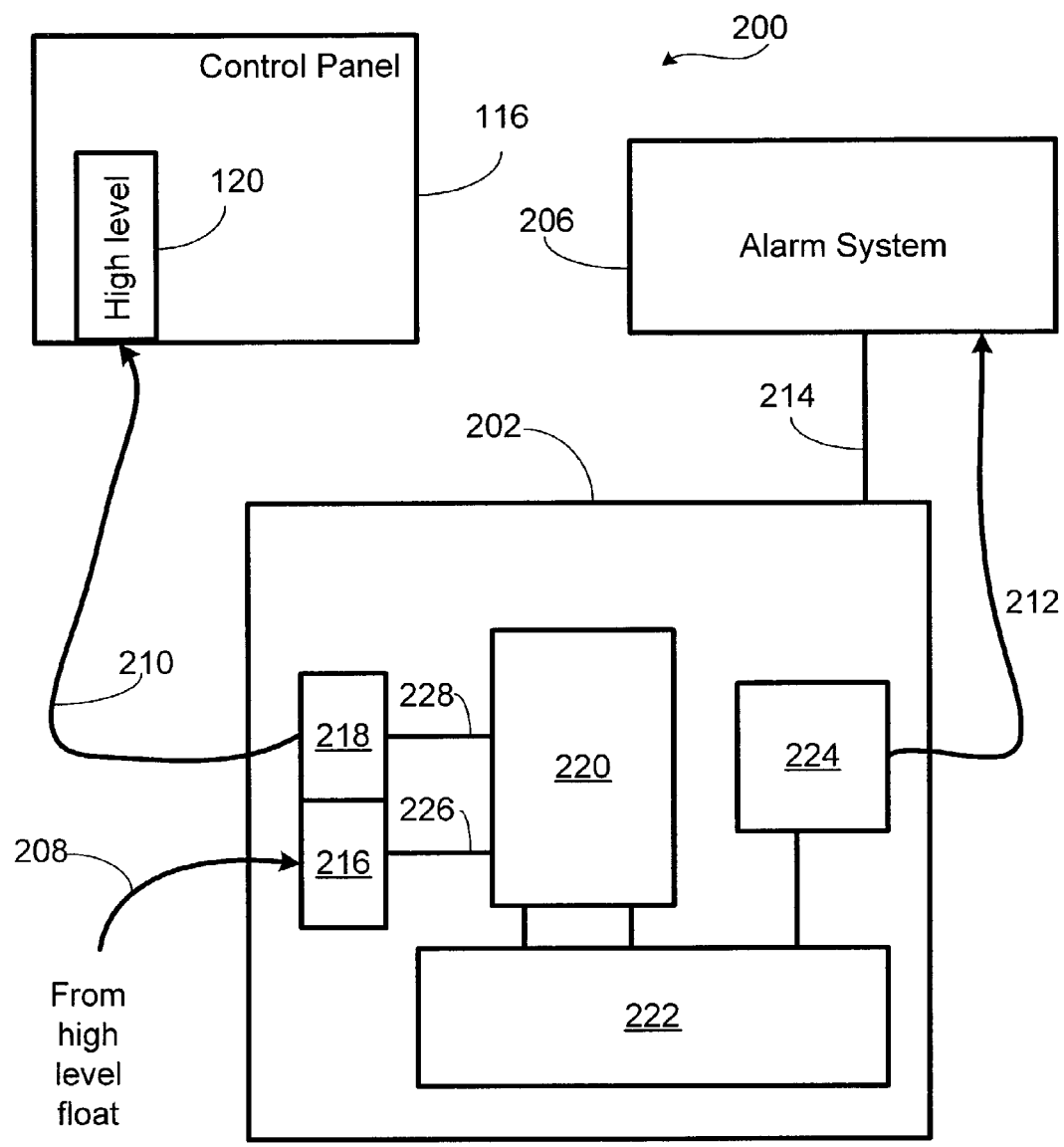
FIG. 2 is a schematic diagram of an alarm detection device according to one embodiment of the invention.

The alarm detection device is installed between an existing high level float and an existing control panel as shown in FIG. 2. Generally, the high level float 110 (not shown in FIG. 2) connects to the high level float connector 120 on the control panel 116. To install the alarm detection device 202, the high level float wires 208 are first disconnected from the control panel 116 and connected to an incoming connector 216 on the alarm detection device 202. Subsequently, two additional wires 210 connect an outgoing connector 218 on the alarm detection device 202 to the control panel 116 at the same location where the high float 110 used to be connected.

The alarm detection device 202 has a plurality of connectors, and the wires 208 from the high level float are connected to the incoming connector 216. Another pair of wires 210 that connects the outgoing connector 218 on the alarm detection device 106 to the high level float connector 120 on the control panel 116. The connectors 218 and 216 are connected to a fail safe circuit 220. The fail safe circuit 220 is further connected to an emulation circuit 222, and the emulation circuit 222 is connected to an output circuit 224.

The fail safe circuit 220 includes a relay (not shown) that is used to reconnect the high level float 110 to the control panel 116 if, for any reason, the alarm detection device 202 fails. This fail safe circuit 220 and its relay are normally energized and provides a fail safe state in the case of device failure. In the fail safe state the high level float 110 and the control panel 116 are reconnected and the alarm detection device 202 is bypassed. The fail safe circuit 220 also causes a high impedance signal to be fed to the alarm system 206 via a wire 212.

The emulation circuit 222 detects the closing and opening of the high level float 110 and employs a relay (not show) to generate an emulated signal of openings and closings of the high level float. The opening and closing of the high level float 110 are reflected by the state signals on the incoming wires 208. The emulated signal is fed to the control panel 116, so the control panel 116 will function as before. The emulated signal is also made available to the alarm system 206 through the output circuit 224.

The emulated signal is fed through the output circuit 224 into the self-contained local or off site transmitting alarm system 206. In this way high level alarms can be detected and enunciated without the addition of a full standby generator for the pump station or the addition of a second high level float. The alarm detection device 202 greatly simplifies the installation of a high float monitoring system as the only point of installation is a known, industry standard interface, namely the connection point of the high float to the control panel.

The alarm detection device 202 is powered by a power supply separate from the control panel 116. In the embodiment shown in FIG. 2, the alarm detection device 202 is powered by the alarm system 206. The power from the alarm system 206 is fed to the alarm detection device 202 through a power connector 214. The power supply may have a backup battery, which would power the alarm detection device 202 when there is a failure of primary AC power. The alarm detection device 202 uses its power and circuitry to detect the closing/opening of the high level float 110.

Figure 3:
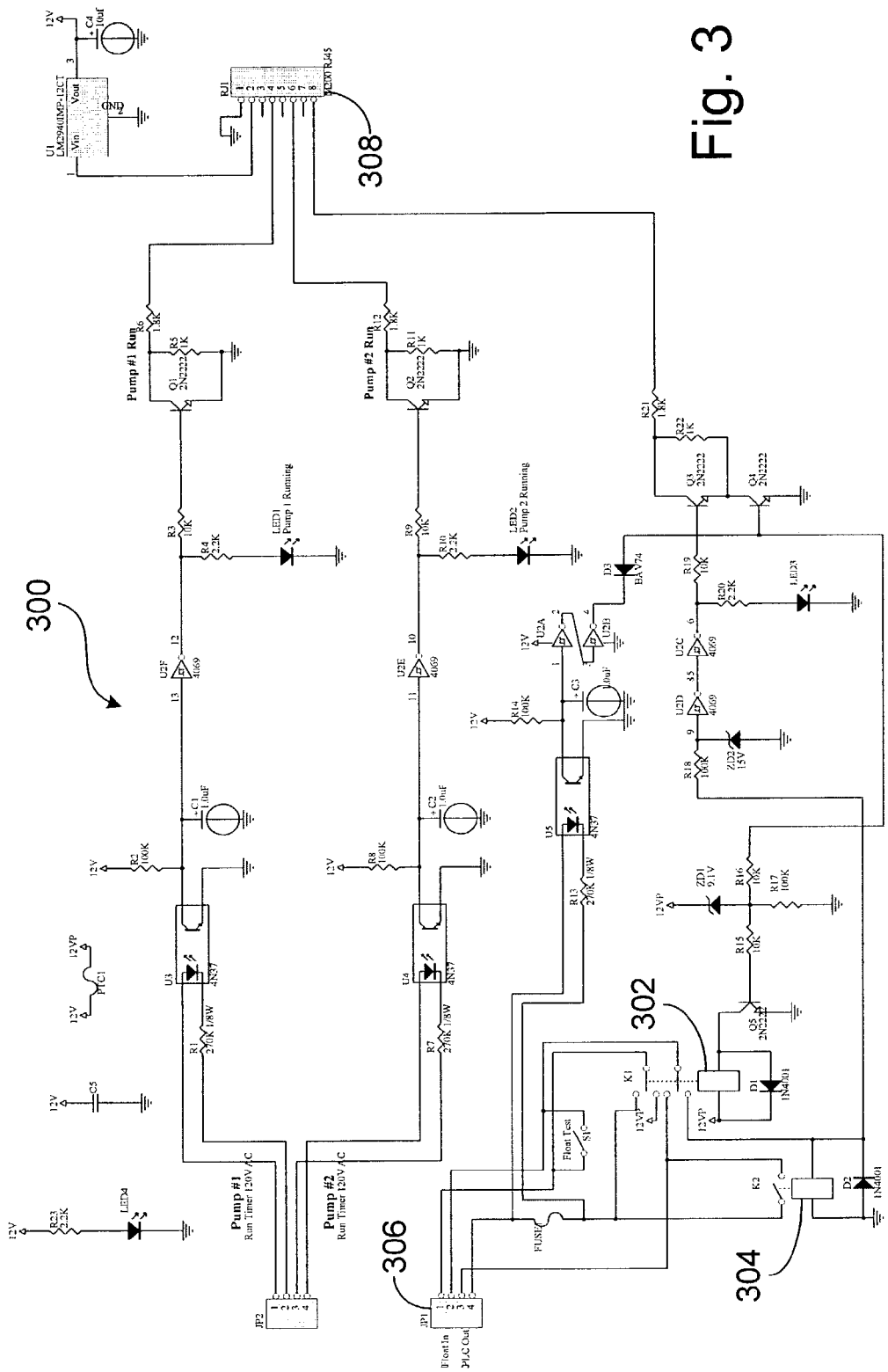
FIG. 3 is a circuit diagram of one embodiment of the alarm detection device.

FIG. 3 is an implementation of a circuit 300 according to the invention. It is shown in FIG. 3 a first connector 306 where high level float wires and outgoing wires to the control panel are connected. It is also shown a first relay 302, a second relay 304, and a second connector 308. The first relay 302 decouples, when energized, a electrical path between the incoming high level float wires and the outgoing wires to the control panel. The second relay 304 emulates incoming state signal, and the second connector 308 makes the emulated signal available for the alarm system.

Additionally, the alarm detection device's self-powered nature allows other feature that would simplify the installation and function of an off site transmitting alarm system to added to the alarm detection device. Many alarm systems for pump stations have a provision that allows them to keep track of the time the station pumps are operating. This is commonly referred to as "pump run times". The monitoring device typically must have a dry contact circuit, activated by the pump running, to indict pump running. This monitoring device often requires a separate, auxiliary dry contact be added. Almost universally these pump stations have 120 VAC driven hour meters to count and display cumulative pump run time. A modified alarm detection device would have circuits that utilized the pump station ground to reference and detect the presence of 120 VAC at the existing hour meters. The circuit would, upon detecting the presence of 120 VAC, relay the "pump running" information to an add on alarm monitoring system. In this manner two valuable monitoring parameters can be detected by a single modified alarm detection device and substantially reduce installation time as the points of interface to the existing pump station would be standard and universal.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. An apparatus for detecting high level alarm in a wet well, the apparatus receiving an incoming state signal from a high level float and transmitting an emulated signal to a control panel and to an alarm system, the apparatus being powered by the alarm system, the apparatus comprising:

a fail safe circuit that decouples a connection between the incoming state signal and the emulated signal to the control panel when power is received from the alarm system and that couples the connection between the incoming state signal and the emulated signal to the control panel when power is not received from the alarm system, wherein the incoming state signal reflects state of the high level float;

an emulation circuit that receives the incoming state signal from the fail safe circuit when the connection is decoupled and that generates the emulated signal according to the incoming state signal.

2. The apparatus of claim 1, wherein the emulation circuit further comprises a relay for generating the emulated signal.

3. The apparatus of claim 1, wherein the emulation circuit, upon a power failure, generates a high impedance signal as the emulated signal to the alarm system.

4. A method for using a high level liquid detection device to monitor a high level alarm in a wet well and to transmit high level alarm to an alarm system without changing configuration of a existing control panel and the wet well, comprising the steps of:

disconnecting high level float wires from a high level float connector on the control panel, the high level float wires being connected to a high level float in the wet well;

connecting the high level float wires to an incoming connector on the high level liquid detection device;

connecting first outgoing wires from the high level liquid detection device to the high level float connector on the control panel;

connecting second outgoing wires from the high level liquid detection device to the alarm system;

receiving an incoming state signal from the high level float wires;

generating an emulated signal based on the incoming state signal, the emulated signal reflecting state of the high level float;

transmitting the emulated signal to the control panel; and transmitting the emulated signal to the alarm system.

5. The method of claim 4 further comprising the step of:

upon power failure, connecting a path from the incoming connector with the first outgoing wires, generating a high impedance signal, and transmitting the high impedance signal to the alarm system.

6. An apparatus for detecting high level alarm in a wet well, the apparatus receiving an incoming state signal from a high level detecting device and transmitting an emulated signal to a control panel and to an alarm system, the apparatus being powered by the alarm system, the apparatus comprising:

first means for receiving the incoming state signal from the high level detecting device and generating the emulated signal according to the incoming state signal, wherein the incoming state signal reflects state of the high level detecting device; and second means for decoupling a connection between the incoming state signal and the emulated signal to the control panel when power is received from the alarm system and for coupling the connection between the incoming state signal and the emulated signal to the control panel when power is not received from the alarm system.

7. The apparatus of claim 6, wherein the first means further comprising a generation means for generating the emulated signal.

8. The apparatus of claim 6, wherein the coupling means decouples the incoming state signal with the emulated signal when the coupling means is energized.

* * * * *